(12) United States Patent
Watanabe

(10) Patent No.: US 6,357,909 B1
(45) Date of Patent: Mar. 19, 2002

(54) RADIATION PYROMETER

(75) Inventor: Minoru Watanabe, Tokyo (JP)

(73) Assignee: Citizen Watch Co., Ltd., Tokyo (JP)

(*) Notice: Subject to any disclaimer, the term of this patent is extended or adjusted under 35 U.S.C. 154(b) by 0 days.

(21) Appl. No.: 09/297,852

(22) PCT Filed: Sep. 10, 1998

(86) PCT No.: PCT/JP98/04067

§ 371 Date: May 6, 1999

§ 102(e) Date: May 6, 1999

(87) PCT Pub. No.: WO99/13305

PCT Pub. Date: Mar. 18, 1999

(30) Foreign Application Priority Data

Sep. 10, 1997 (JP) ............................................. 9-244970

(51) Int. Cl.[7] ................................ G01J 5/00; G01J 5/04
(52) U.S. Cl. ...................... 374/131; 374/208; 374/121; 374/129; 374/133
(58) Field of Search ................................ 374/120, 121, 374/208, 209, 129, 133, 131; 600/549; 250/252.1 A, 338.1

(56) References Cited

U.S. PATENT DOCUMENTS

| | | | | |
|---|---|---|---|---|
| 4,150,552 A | * | 4/1979 | Altman | 62/467 |
| 4,895,164 A | * | 1/1990 | Wood | 600/549 |
| 5,108,423 A | * | 4/1992 | Lu | 606/234 |
| 5,293,877 A | * | 3/1994 | O'Hara et al. | 128/736 |
| 5,464,284 A | * | 11/1995 | Rall | 374/131 |
| 5,626,139 A | * | 5/1997 | Szeles et al. | 128/664 |
| 5,857,775 A | * | 1/1999 | Vodzak et al. | 374/131 |

FOREIGN PATENT DOCUMENTS

| | | |
|---|---|---|
| JP | 5277079 | 10/1993 |
| JP | 8191800 | 7/1996 |
| JP | 8313357 | 11/1996 |
| JP | 9820790 | * 5/1998 |

* cited by examiner

*Primary Examiner*—Diego Gutierrez
*Assistant Examiner*—Lydia M. De Jesús
(74) *Attorney, Agent, or Firm*—Townsend and Townsend and Crew LLP

(57) ABSTRACT

A radiation thermometer that avoids deterioration of measurement accuracy or loss of hygiene due to a dirty front end of a probe portion of the radiation thermometer, lowers running costs which are created if a probe cover is used, and reduces the labor of procuring the probe cover. To this end, the front end of the probe portion of the radiation thermometer has a waterproof structure so that the front end of the probe portion can be wiped with alcohol or the like.

17 Claims, 7 Drawing Sheets

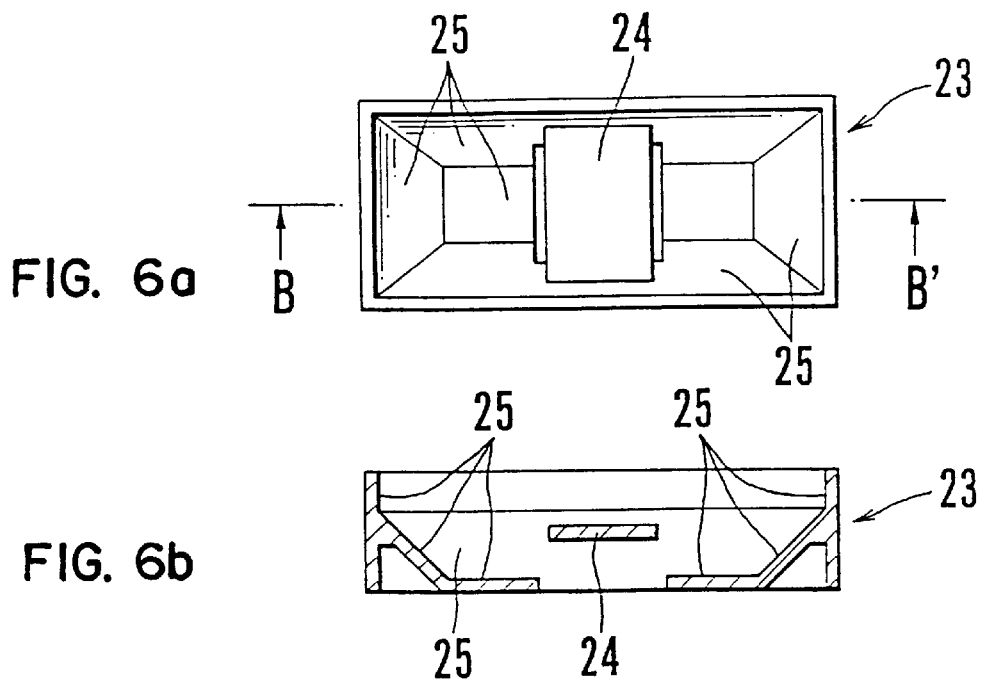
FIG. 6a
FIG. 6b
F I G. 7
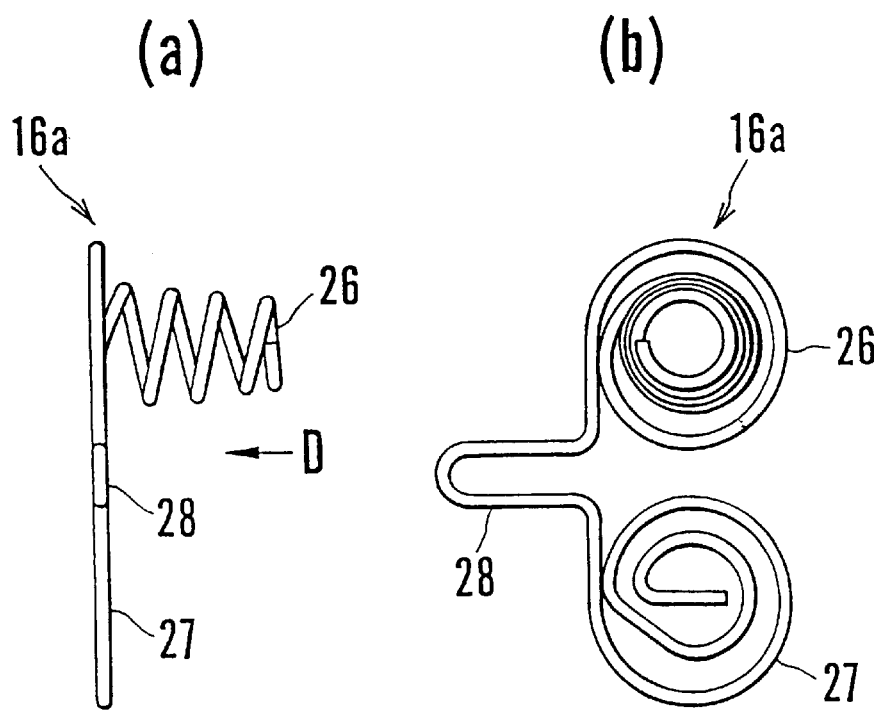

RADIATION PYROMETER

The present invention relates to a radiation thermometer.

BACKGROUND OF THE INVENTION

For the purpose of measuring a body temperature in a short period of time, a radiation thermometer which selects an eardrum as a measurement site and measures a temperature of the eardrum in a non-contact manner has been already proposed.

An example is a radiation thermometer which is described in Japanese Laid-Open Patent Publication No. 28524/1990. This radiation thermometer allows a front end of a probe portion, which comprises a window member at a front end and an infrared ray sensor at a rear end, to be inserted into an external acoustic opening, so that an infrared ray from the eardrum is received by the infrared ray sensor through the window member and the temperature of the eardrum, i.e., the body temperature, is measured based on the intensity of the received infrared ray.

Since this type of radiation thermometer measures a body temperature based on the intensity of an infrared ray from the eardrum, the dirtiness of the optical system which receives the infrared ray has influence on measurement accuracy. However, an external acoustic opening becomes dirty because of earwax and the like, and therefore, measuring a body temperature several times causes a problem in that the window member serving as an optical system of the front end of the probe portion is gradually smudged. Further, it is unhygienic where more than one person shares the same radiation thermometer.

To solve this problem, the radiation thermometer described in Japanese Laid-Open Patent Publication No. 28524/1990 comprises a probe cover designed to cover the front end of the probe portion which is inserted into an external acoustic opening. The probe cover prevents the probe portion of the radiation thermometer from directly contacting the external acoustic opening. In addition, since the probe cover is disposable for each measurement of a body temperature, there is no problem in that a dirty optical system deteriorates a measurement accuracy, and there is no hygienic problem.

However, when a probe cover is used as in the case of the radiation thermometer described in Japanese Laid-Open Patent Publication No. 28524/1990 described above, a new probe cover is necessary each time a body temperature is measured, which is costly. Hospitals, in particular, which need to measure body temperatures frequently must bear a considerable running cost.

Further, since a conventional radiation thermometer which uses probe covers requires discarding the probe cover each time a body temperature is measured, it is necessary to procure new probe covers often, which is labor-consuming.

SUMMARY OF THE INVENTION

The present invention has been made in view of the problems above. Accordingly, an object of the present invention is to provide a radiation thermometer which prevents deterioration of measurement accuracy and loss of hygiene due to a smudged front end of a probe portion, reduces running costs which are created by use of the probe cover and omits the labor of procuring a probe cover.

To attain the object above, a radiation thermometer of the present invention comprises: a window member which transmits an infrared ray; light-guiding means for guiding the infrared ray which is transmitted by the window member from a measurement target; an infrared ray sensor for detecting the infrared ray which is guided by the light-guiding means; a temperature-sensitive sensor for measuring a reference temperature and generating a reference temperature signal; a case means which covers at least the light-guiding means, an infrared ray sensor and a temperature-sensitive sensor which comprises a probe portion which is inserted into an opening of a living being; a temperature calculating means for calculating a temperature of the measurement target based on signals from the infrared ray sensor and the temperature-sensitive sensor; and an indicating means for indicating a temperature based on a signal from the temperature calculating means, characterized in that at least the probe portion comprises waterproof means.

The probe portion comprises at least an opening portion in which only an infrared ray introducing side of the light-guiding means is exposed, and the waterproof means is a waterproof member which waterproofs a gap between the light-guiding means and the probe portion located at the opening portion.

The waterproof member includes a holding member which fits with an outer periphery of the light-guiding means, and holds the window member in the vicinity of the opening portion; a first packing which between the holding member and the probe portion; and a second packing arranged between the holding member and the light-guiding means.

The holding member comprises a pressuring portion which presses and holds the window member towards the light-guiding means, and the window member is firmly held by the pressuring portion and the second packing.

The light-guiding means is formed by a light-guiding tube, and the holding member comprises a monolithically integrated engagement portion which fits with an outer surface of the light-guiding tube.

The light-guiding tube comprises a stepped portion for attaching the second packing to a front end portion of the light-guiding tube.

The holding member comprises an abutting portion for abutting against the stepped portion for the purpose of positioning, the window member is firmly held between the holding member and the second packing with the abutting portion abutting the stepped portion, and a gap is provided between the window member and the front end portion of the light-guiding tube.

The second packing protrudes beyond the front end portion of the light-guiding tube, and the window member is firmly held between the holding member and the second packing.

The holding member comprises a concave portion for positioning the first or the second packing.

The radiation thermometer further comprises a temperature difference information detecting means for detecting temperature difference information regarding the infrared ray sensor and the light-guiding means, wherein the temperature calculating means calculates a temperature of the measurement target based on signals from the infrared ray sensor and the temperature-sensitive sensor and the temperature difference information received from the temperature difference information detecting means.

The temperature difference information detecting means is formed by: a first temperature-sensitive sensor for measuring a temperature of the infrared ray sensor and an area around the same; and a second temperature-sensitive sensor for measuring a temperature of the light-guiding means.

The temperature difference information detecting means is formed by: a reference cavity whose temperature condition is approximately the same as a temperature condition of the light-guiding means and which is closed whereby infrared rays from outside does not enter; and a reference infrared ray sensor for detecting an infrared ray from the reference cavity.

The window member is formed by an optical crystal material.

The optical crystal material is calcium fluoride, silicon, antireflection silicon, or barium fluoride.

A heat insulation cavity is provided between the probe portion and the light-guiding tube.

The light-guiding means, the infrared ray sensor and the temperature-sensitive sensor are linked to each other by a metal housing which has excellent thermal conductivity.

BRIEF DESCRIPTION OF DRAWINGS

FIGS. 6(a) and 6(b) are a plan view and a cross sectional view taken along the line B–B', respectively, of reflecting means which is used in a display apparatus shown in FIG. 1(a);

FIG. 7(a) is a plan view of a battery series connecting spring shown in FIG. 3;

FIG. 7(b) is a view of the battery series connecting spring as viewed in a direction D in FIG. 7(a)

The present invention will be described in the following with reference to the associated drawings.

Figure 1A:
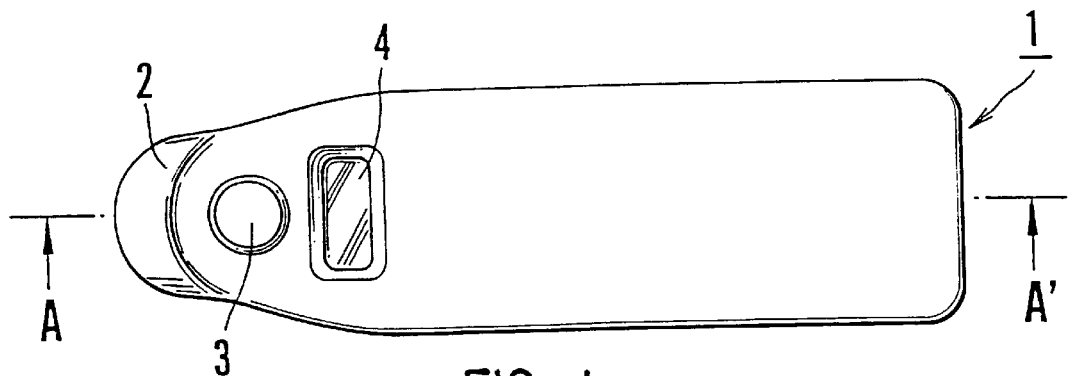
FIG. 1(a) is a plan view of a radiation thermometer according to a preferred embodiment of the present invention.
Figure 1B:
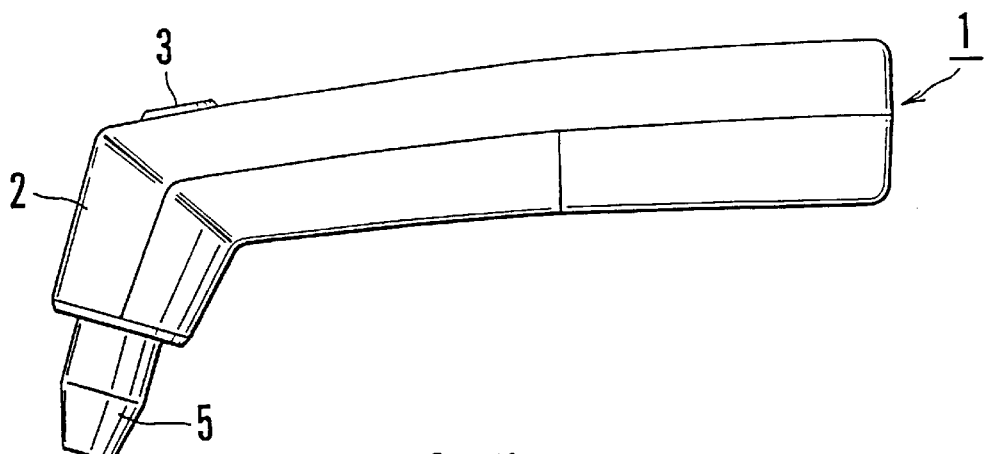
FIG. 1(b) is a side view of the right-hand side of the radiation thermometer.
Figure 1C:
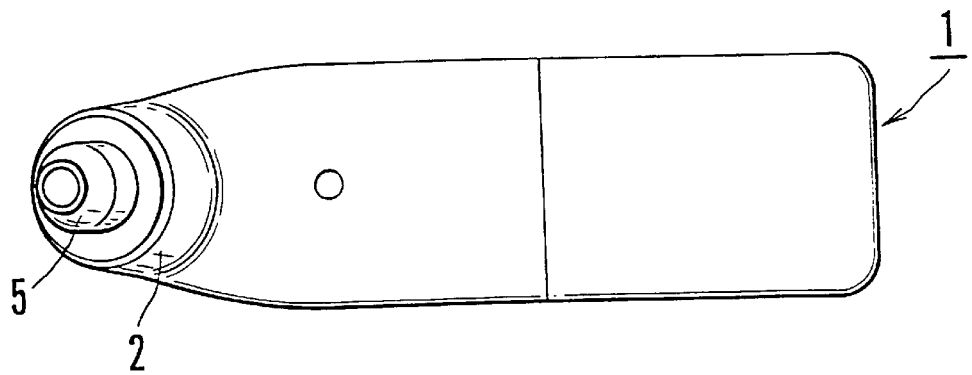
FIG. 1(c) is a bottom view of the radiation thermometer.

FIGS. 1(a) through 1(c) is an appearance view of a radiation thermometer according to a preferred embodiment of the present invention. FIG. 1(a) shows a plan view, FIG. 1(b) shows a side view of the right-hand side, and FIG. 1(c) is a bottom view.

As shown in FIG. 1(a), a radiation thermometer 1 comprises an operation button 3 and a display apparatus 4 in an upper portion of case means 2. Further, as shown in FIGS. 1(b) and 1(c), a probe portion 5 is disposed at a front end of the case means 2. To measure a body temperature, the operation button 3 is pressed with the front end of the probe portion 5 inserted into an external acoustic opening. The radiation thermometer 1 receives an infrared ray from an eardrum, calculates a body temperature based on the intensity of the infrared ray, and displays the body temperature in the display apparatus 4.

The material of the case means 2 and the probe portion 5 is an ABS resin, etc., for instance.

Figure 2:
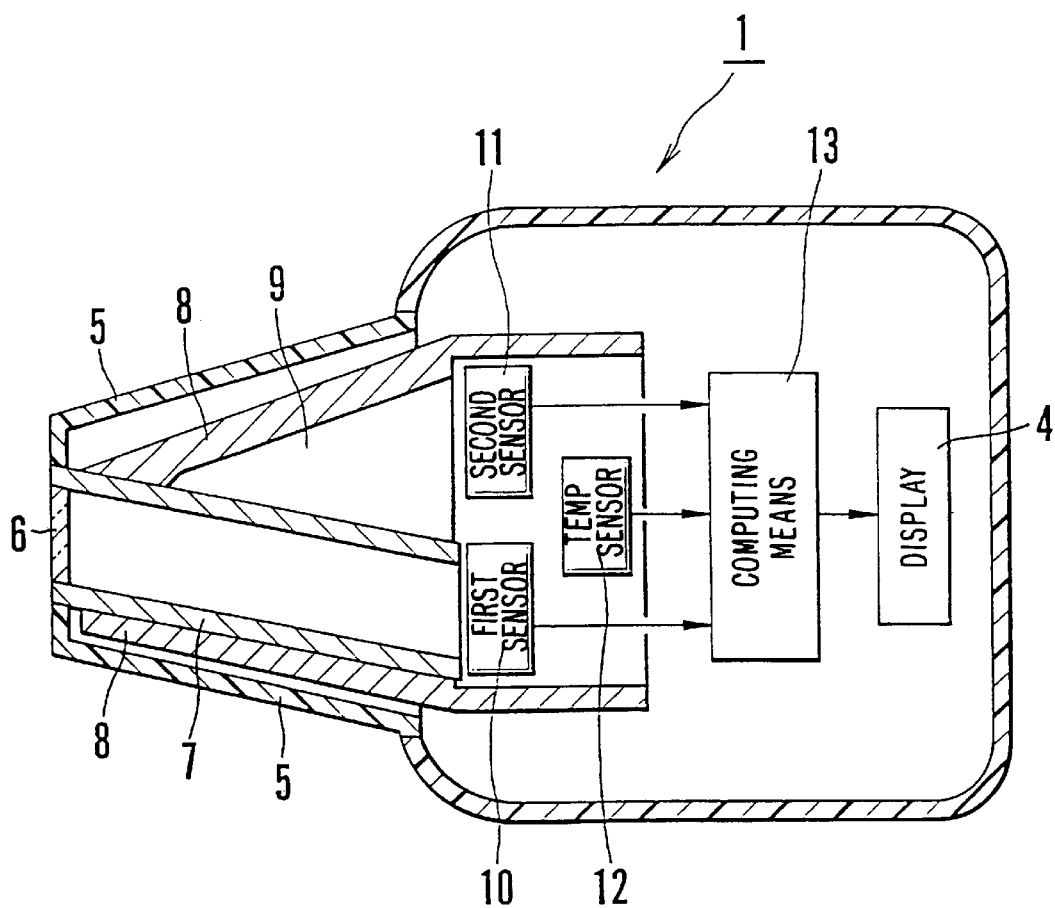
FIG. 2 is a block diagram of the radiation thermometer shown in FIGS. 1(a) through 1(c)

FIG. 2 is a block diagram of the radiation thermometer 1 which is shown in FIGS. 1(a) through 1(c).

As shown in FIG. 2, a light-guiding tube 7 which serves as light-guiding means for guiding an infrared ray and a metal housing 8 which supports the light-guiding tube 7 are contained in the probe portion 5. A window member 6 which transmits an infrared ray is disposed at the front end of the light-guiding tube 7. A first infrared ray sensor 10, which is disposed at the rear end of the light-guiding tube 7, receives an infrared ray from a measurement target transmitted by the window member 6. Further, an outer wall of the light-guiding tube 7 and an inner wall of the metal housing 8 form a reference cavity 9. A front end of the reference cavity 9 is sealed, and a second infrared ray sensor 11 disposed at the rear end of the reference cavity 9 receives an infrared ray which is created by temperatures of the light-guiding tube 7 and the metal housing 8. Denoted at 12 is a temperature-sensitive sensor which detects temperatures of the first infrared ray sensor 10 and the second infrared ray sensor 11. Temperature calculating means 13 calculates a temperature of a measurement target based on signals from the first infrared ray sensor 10, the second infrared ray sensor 11 and the temperature-sensitive sensor 12, and displays the calculated temperature in the display apparatus 4 which serves as an indicating means which displays a temperature of a measurement target.

Now, the process whereby the temperature calculating means 13 calculates a temperature of a measurement target will be described.

In general, an infrared ray sensor receives an infrared ray whose intensity corresponds to a temperature which is obtained by subtracting a temperature of the infrared ray sensor itself from a temperature of a measurement target. Hence, in the temperature calculating means 13, it is necessary to add temperatures of the first infrared ray sensor 10 and the second infrared ray sensor 11 detected by the temperature-sensitive sensor 12 to a temperature which corresponds to the intensity of the infrared ray which is detected by the first infrared ray sensor 10.

Further, in a case the temperature of an optical system such as the window member 6 and the light-guiding tube 7 is different from a temperature of the first infrared ray sensor 10 (In some cases, for example, after a certain period of time since the probe portion 5 is inserted into an external acoustic opening, the temperature of the optical system increases due to the heat of the external acoustic opening.), the infrared ray detected by the first infrared ray sensor 10 contains an infrared ray from the optical system in addition to an infrared ray from a measurement target (e.g., an eardrum). Hence, the second infrared ray sensor 11 which serves as a temperature difference information detecting means receives only an infrared ray from the optical system while the temperature computing means 13 subtracts the intensity of the infrared ray detected by the second infrared ray sensor 11 from the intensity of the infrared ray detected by the first infrared ray sensor 10, whereby only the intensity of the infrared ray from the measurement target is found. The light-guiding tube 7 and the metal housing 8 are formed by a material which has excellent thermal conductivity in order to ensure that temperatures of the light-guiding tube 7 and the metal housing 8 are nearly identical.

Figure 3:
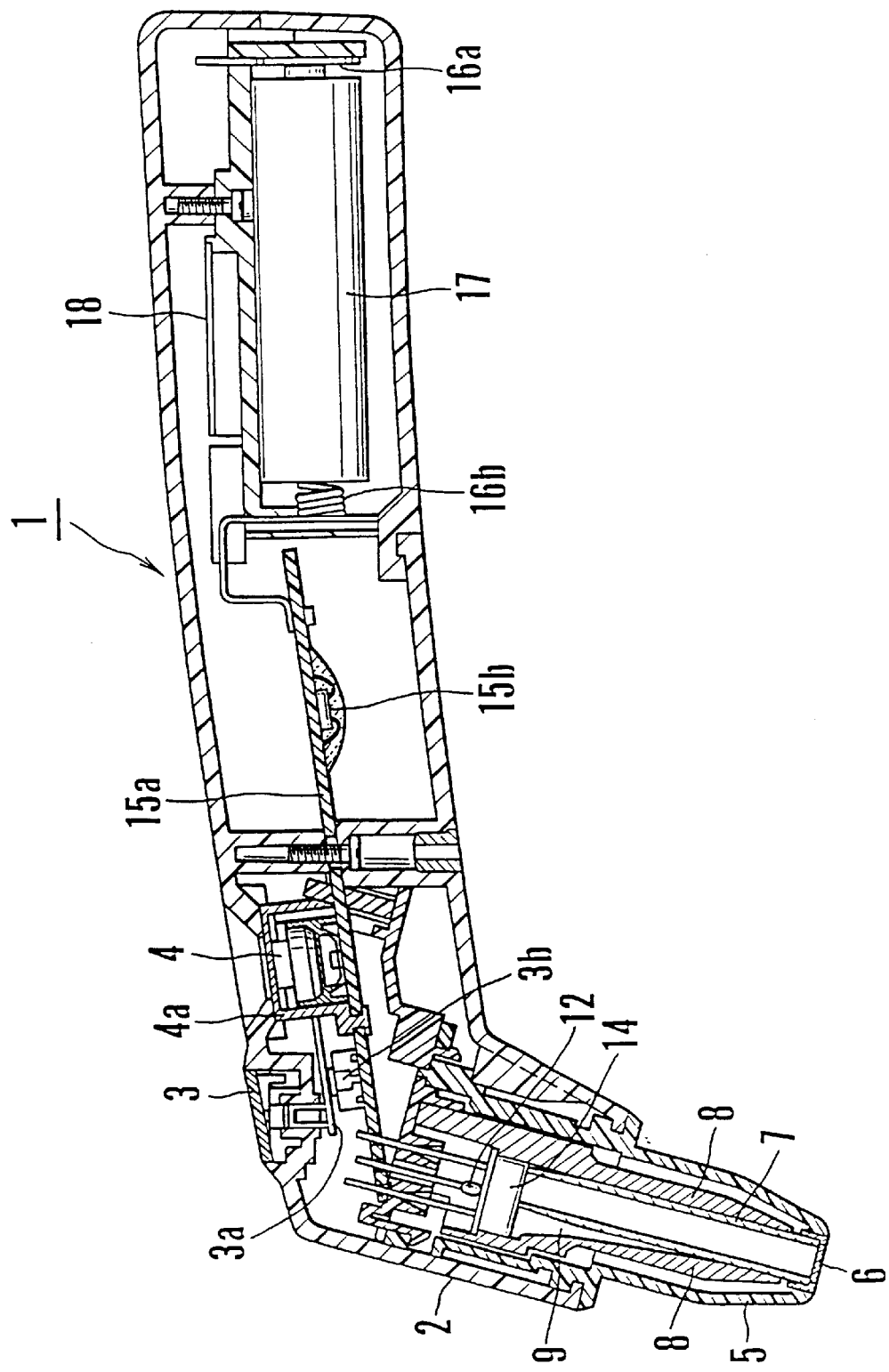
FIG. 3 is a cross sectional view of the radiation thermometer shown in FIG. 1(a) taken along the line A–A'.

FIG. 3 is a cross sectional view of the radiation thermometer 1 which is shown in FIG. 1(a) taken along the line A–A'.

In FIG. 3, 14 indicates an infrared ray detecting portion which comprises the first infrared ray sensor 10 and the second infrared ray sensor 11 shown in FIG. 2. Denoted at 15a is a circuit board which mounts an IC 15b which comprises the temperature calculating means 13 which is shown in FIG. 2. The radiation thermometer 1 is driven by a battery 17 which serves as a power source. The battery 17 is fixed by a battery series connecting spring 16a and a battery terminal 16b which will be described later, and is connected electrically. A buzzer 18 is provided for informing completion of a body temperature measurement and the like.

The material of the metal housing 8 is aluminum, etc., for instance, whereas the material of the light-guiding tube 7 is copper, brass, stainless steel or the like. Further, the material of the window member 6 is an optical crystal material such as calcium fluoride, silicon, antireflection silicon, barium fluoride, etc.

A button returning spring 3a is disposed below the operation button 3, and a switch 3b is disposed further below which instructs the circuit board 15a to start a temperature measurement when turned on. The button returning spring 3a is pressed down as the operation button 3 is pressed down, thereby turning on the switch 3b. The button returning spring 3a, being a blade spring which is monolithically integrated with an LCD cover 4a which covers the display apparatus 4, exerts a force so as to push up the operation button 3 when pressed down by the operation button 3, pushing back the pressed operation button 3 to the original condition.

Further, since the button returning spring 3a which is shaped as a blade spring is disposed between the operation button 3 and the switch 3b, it is possible to arrange the operation button 3 and the switch 3b shifted against each other in a range reachable for the button returning spring 3a instead of disposing the operation button 3 and the switch 3b in a linear arrangement, and therefore, the position of the operation button 3 is less restricted during designing.

Figure 4:
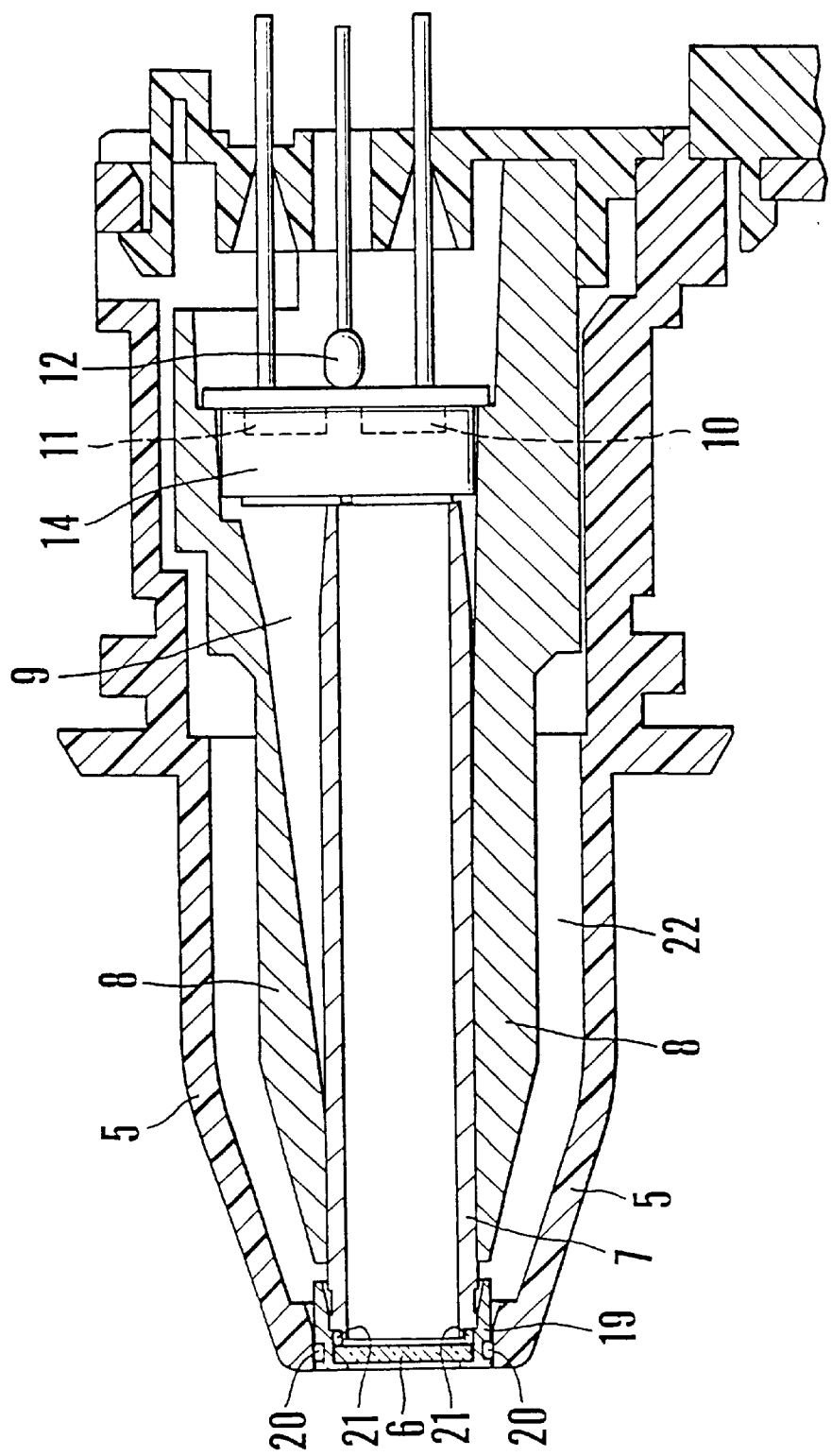
FIG. 4 is a view expanding an area near a probe portion which is shown in the cross sectional view of the radiation thermometer of FIG. 3.

FIG. 4 is a view expanding the area near a probe portion 5 which is shown in the cross sectional view of the radiation thermometer 1 of FIG. 3.

A gap between the probe portion 5 and a holding member 19 is waterproofed and sealed with a first packing 20, while a gap between the holding member 19 and the light-guiding tube 7 is waterproofed and sealed with a second packing 21. Further, a heat insulation cavity 22 is created between the probe portion 5 and the metal housing 8, which makes it less likely for the heat of an external acoustic opening to transmit to the metal housing 8, the light-guiding tube 7 and the like when the probe portion 5 contacts the external acoustic opening.

The material of the holding member 19 is copper, for example, and the material of the first packing 20 and the second packing 21 is an elastic material such as rubber.

Further, the light-guiding tube 7 and the holding member 19 are formed in the shape of a cylinder, for instance. The window member 6 is formed in the shape of a disk. The first packing 20 and the second packing 21 are formed in the shape of a rubber band.

Figure 5:
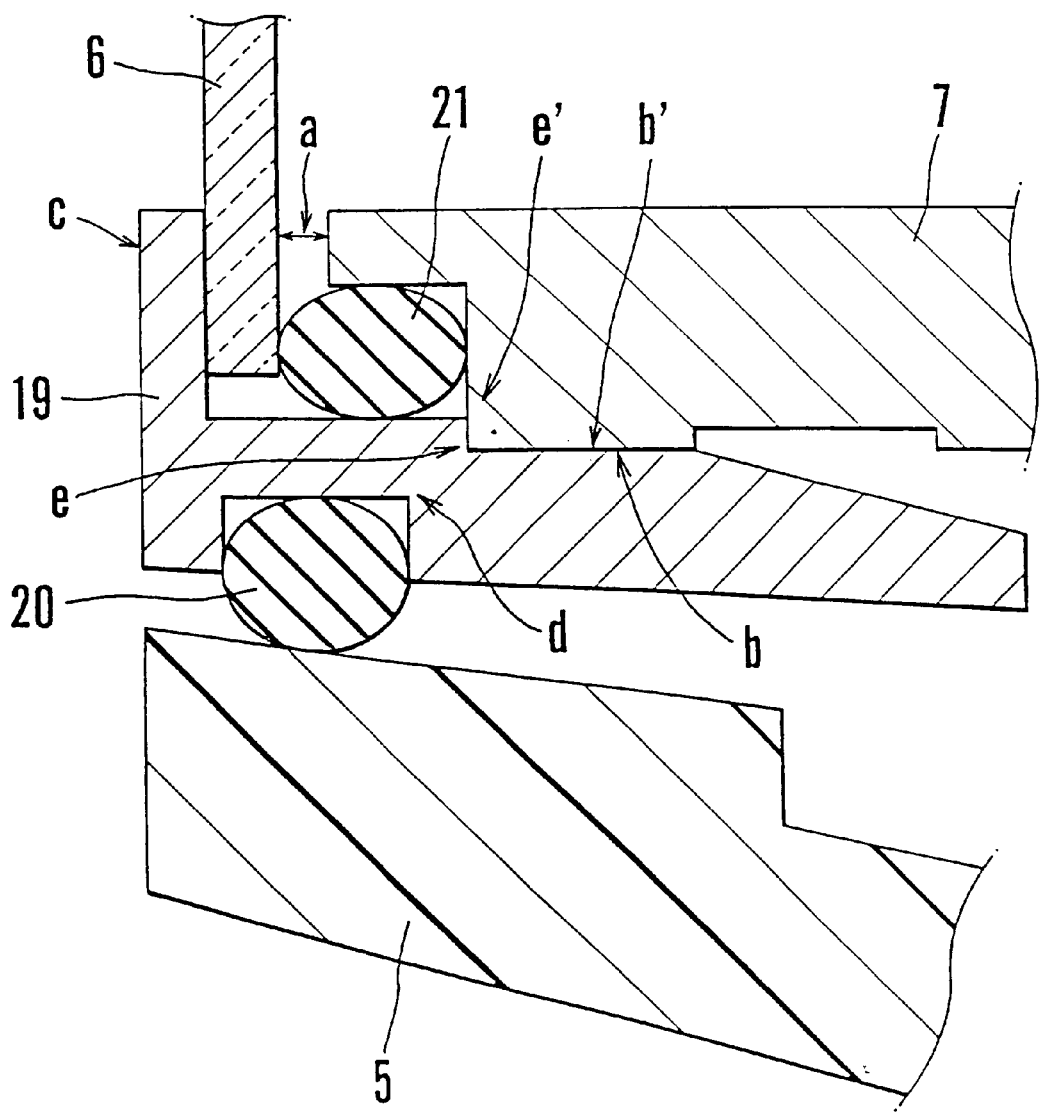
FIG. 5 is a view further expanding an area near a holding member shown in the expanded cross sectional view in FIG. 4.

FIG. 5 is a view further expanding an area near the holding member 19 which is shown in the expanded cross sectional view in FIG. 4.

In the preferred embodiment, the second packing 21 and the holding member 19 are used to link the light-guiding tube 7 and the window member 6 to each other, whereby an inner surface of the light-guiding tube 7 is waterproofed. More specifically, as shown in FIG. 5, a stepped portion e' is formed at the front end of the light-guiding tube 7, the second packing 21 is fit to the stepped portion e', the window member 6 is placed on the second packing 21, and the holding member 19 is engaged with the light-guiding tube 7. The second packing 21 is pressured by the window member 6, the light-guiding tube 7 and the holding member 19, whereby a sufficiently necessary waterproofing effect is created between the second packing 21, the window member 6, the light-guiding tube 7 and the holding member 19.

The window member 6 is held and fixed by the second packing 21 and a claw c which serves as a pressuring portion. Since the material of the window member 6 is easily damaged when pressed at both surfaces by a metal material, the preferred embodiment requires that a stepped portion e, which serves as an abutting portion, of the holding member 19 and the stepped portion e' of the light-guiding tube 7 abut each other so that the second packing 21 protrudes beyond the front end of the light-guiding tube 7, a gap a is ensured between the window member 6 and the front end of the light-guiding tube 7, and damage to the window member 6 is avoided. Further, to prevent the holding member 19 from becoming detached from the light-guiding tube 7, a friction force between a surface b of the holding member 19 and a surface b' of the light-guiding tube is set to somewhat exceed a restoring force against a pressure from the second packing 21.

Further, in the preferred embodiment, the first packing 20, the second packing 21 and the holding member 19 are used in order to waterproof between the light-guiding tube 7 and the probe portion 5. The second packing 21 waterproofs between the light-guiding tube 7 and the holding member 19 when pressured by the light-guiding tube 7 and the holding member 19, whereas the first packing 20 waterproofs between the holding member 19 and the probe portion 5 when pressured by the holding member 19 and the probe portion 5.

A concave portion d is formed in the holding member 19, and the first packing 20 is fit to the concave portion d. This prevents displacement of the first packing 20 while joining the probe portion 5 to the light-guiding tube 7 with the holding member 19 mounted. In addition, although not disposed in FIG. 5, a concave portion may be formed in a portion of the holding member 19 which contacts the second packing 21. This allows to position the second packing 21 and prevents the second packing 21 from becoming displaced.

While a disposable probe cover is used for the purpose of measurement of a body temperature according to a conventional technique, in the preferred embodiment, the probe portion 5 is inserted directly into an external acoustic opening for measurement of a body temperature without using a probe cover. After measurement of a body temperature is completed, the front end of the probe portion 5 is cleaned and disinfected using alcohol, water, etc. As described above, in the preferred embodiment, since the front end of the probe portion 5 has a waterproof structure, alcohol, water or the like does not enter inside the radiation thermometer 1, and therefore, it is possible to protect electrical circuits and the like.

It is possible to always maintain the hygiene of the radiation thermometer in this manner, and eliminate a deterioration of measurement accuracy which is caused by a dirty optical system. Further, since a probe cover is not necessary, it is possible to reduce running costs which are otherwise needed as the cost for purchasing a probe cover.

Furthermore, the display apparatus 4 according to the preferred embodiment shown in FIGS. 1(a) and 3 is a liquid crystal display apparatus, and as such, with a liquid crystal irradiated from behind with a backlight, displays brighter and easier for observation. Where a liquid crystal is irradiated from behind, it is desirable to irradiate efficiently utilizing reflection. Now, the reflecting means used in the display apparatus 4 will be described.

FIGS. 6(a) and 6(b) is an appearance view of the reflecting means which is used in the display apparatus 4 which is shown in FIG. 1(a). FIGS. 6(a) and 6(b) are a plan view and a cross sectional view taken along the line B–B', respectively.

The reflecting means 23 has a structure comprising a blocking portion 24 and a reflection surface 25. A crisscross size of the reflecting means 23 shown in FIG. 6(a) is the same as the size of a liquid crystal. In the preferred embodiment, an LED not shown, for example, is used as a backlight and disposed at a lower portion of the blocking portion 24 shown in FIG. 6(b). Although light from the LED directed above is temporarily blocked by the blocking portion 24, light from the LED directed in a horizontal direction is reflected at the reflection surface 25, and the reflected light illuminates the liquid crystal which is disposed in an upper portion of the reflecting means 23. In this manner, it is possible to uniformly irradiate the entire surface of the liquid crystal, which makes the display apparatus easy to observe.

Next, the battery series connecting spring 16a shown in FIG. 3 will be described.

FIGS. 7(a) and 7(b) is an appearance view of the battery series connecting spring 16a shown in FIG. 3. FIG. 7(a) shows a plan view, while FIG. 7(b) shows the battery series connecting spring as viewed in a direction D in FIG. 7(a).

The radiation thermometer 1 shown in FIG. 3 is a radiation thermometer which type operates using two batteries. The second battery is behind the battery 17 in FIG. 3. The battery series connecting spring 16a connects these two batteries in series to each other and allows to extract an intermediate potential which is a voltage of one battery. The minus terminal of the first battery is connected to a minus terminal 26 of the battery series connecting spring 16a, and a plus terminal of the second battery is connected to a plus terminal 27 of the battery series connecting spring 16a.

This permits extracting and using a voltage which is equivalent to two batteries between a plus terminal of the first battery and a minus terminal of the second battery. Further, it is possible to extract and use a voltage equivalent to one battery between the plus terminal of the first battery or the minus terminal of the second battery and an intermediate potential extracting terminal 28.

Figure 8:
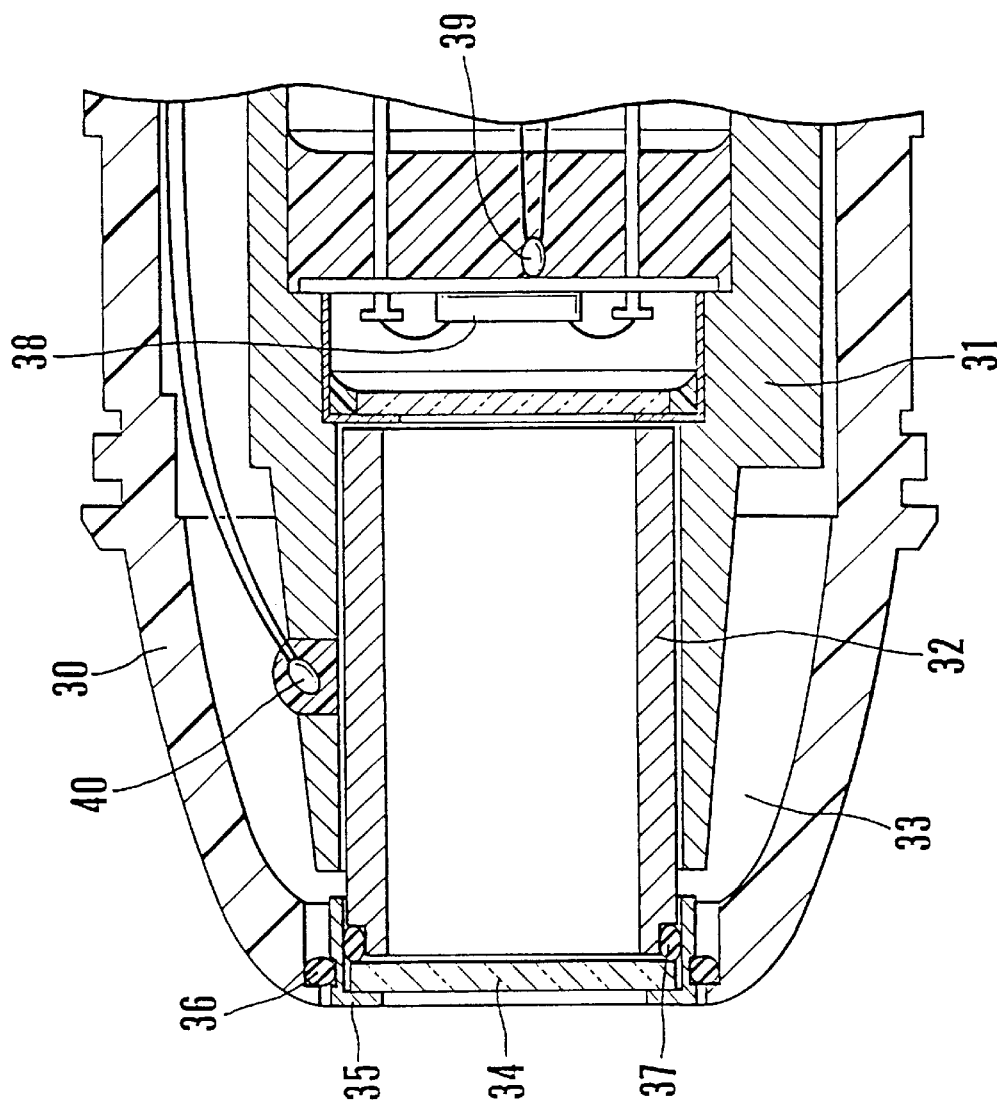
FIG. 8 is a schematic structure diagram of a radiation thermometer which has a different structure from that of FIG. 2.

Although the preferred embodiment above is an application of the present invention to a radiation thermometer which uses two infrared ray sensors and one temperature-sensitive sensor as shown in the block diagram in FIG. 2, the present invention is not limited to this but is applicable to a radiation thermometer which has a different structure. FIG. 8 shows one example.

FIG. 8 is a schematic structure diagram of a radiation thermometer which has a different structure from that shown in FIG. 2.

The radiation thermometer shown in FIG. 8 comprises a metal housing 31 and a light-guiding tube 32 inside a probe portion 30, and a heat insulation cavity 33 is created between the probe portion 30 and the metal housing 31. A window member 34 is created at the front end of the light-guiding tube 32, for which a holding member 35, a first packing 36 and a second packing 37 are used. The structure of this portion is similar to that shown in FIG. 5, and therefore, a detailed description will be omitted.

An infrared ray sensor 38 receives an infrared ray from a measurement target through the light-guiding tube 32 and detects the intensity of the infrared ray, a first temperature-sensitive sensor 39 detects a temperature of the infrared ray sensor 38, while a second temperature-sensitive sensor 40 which serves as a temperature difference information detecting means detects a temperature of an optical system such as the light-guiding tube 32. In the example shown in FIG. 8 as well, infrared rays which the infrared ray sensor 38 receives are both an infrared ray from a measurement target and an infrared ray from the optical system. Hence, as a temperature which is detected by the first temperature-sensitive sensor 39 is added to while a temperature which is detected by the second temperature-sensitive sensor 40 is subtracted from a temperature which corresponds to the intensity of an infrared ray which is detected by the infrared ray sensor 38, a temperature of a measurement target is calculated.

While the radiation thermometer having a waterproof structure according to the present invention described above does not need a probe cover since the front end of the probe portion is cleaned and disinfected with alcohol, water or the like in order to use the probe portion, during cleaning and disinfection, heat from the evaporation of alcohol, water or the like creates a temperature difference between the optical system and the infrared ray sensor which receives an infrared ray from a measurement target in some cases. Normally, this can be overcome by not using the radiation thermometer for a while until the temperature difference between the two disappears and thereafter measuring a body temperature. However, one may wish to start measurement of a body temperature immediately after cleaning and disinfection, in which case the temperature difference information detecting means may be combined with the waterproof radiation thermometer as described above. That is, the temperature difference information detecting means described above makes it possible to accurately measure a body temperature despite a temperature difference between the optical system and the infrared ray sensor which receives an infrared ray from a measurement target.

Although the preferred embodiment above is related to an example where the radiation thermometer according to the present invention is inserted into an external acoustic opening for measurement of a human body temperature, the radiation thermometer according to the present invention can be inserted into an orifice other than an external acoustic opening to measure a body temperature, or for animals other than human beings, and can be inserted into an ear of an animal to measure body temperature of the animal. Thus, applications of the radiation thermometer according to the present invention are not limited in particular.

As described above, since the probe portion has a waterproof structure, it is possible to clean and disinfect a portion of the front end of the probe portion which is to be inserted into an external acoustic opening with alcohol, water or the like at the end of measurement of a body temperature, always maintain the radiation thermometer hygienically, and eliminate a deterioration of measurement accuracy which is caused by a dirty optical system. Further, since a probe cover is not necessary, it is possible to reduce running costs which are otherwise needed as a cost for purchasing the probe cover.

Further, it is possible to waterproof an infrared ray introducing side of the front end of the probe portion, thereby creating a similar effect.

Further, since an adhesive or the like is not used, there is no possibility that an adhesive will extrude, and it is easy to assemble the radiation thermometer. In addition, since one of the members which firmly holds the window member is an elastic packing, no damage will be made to the window member.

Further, it is easy to assemble the radiation thermometer.

Further, the packings do not become displaced when the holding member is fit to the light-guiding tube.

Further, it is possible to ensure a gap between the light-guiding tube and the window member, which prevents damage to the window member.

Further, since one of the members which firmly holds the window member is an elastic packing, no damage will be made to the window member.

Further, the packings do not get displaced when the holding member and the probe portion are combined with each other.

Further, even when there is a temperature difference between the optical system and the infrared ray sensor which receives an infrared ray from a measurement target, it is possible to accurately measure a temperature. More specifically, measurement of a temperature is possible even when the front end of the probe portion is cooled due to heat from evaporation of alcohol immediately after being cleaned with alcohol, for example, even right after the front end of the probe portion is cleaned and disinfected, it is possible to start measurement of a temperature immediately.

Further, it is possible to start measurement of a temperature immediately after cleaning and disinfection of the front end of the probe portion.

Further, it is possible to start measurement of a temperature immediately after cleaning and disinfection of the front end of the probe portion.

Further, since the window member is formed by an optical crystal material, even if the window member is touched while the front end of the probe portion is wiped off or in other instances, the window member does not become damaged.

Further, as in the case of the invention as defined in claim 13, the window member does not become damaged even if the window member is touched while the front end of the probe portion is wiped off or in other instances. In addition, it is possible to transmit an infrared ray from a measurement target without attenuating the infrared ray.

Further, an external temperature change does not easily transfer to the optical system such as the light-guiding means.

Further, the thermal balance of the optical system does not easily fail.

Thus, the present invention is favorably applied to a radiation thermometer which measures a temperature of a living being when inserted into an opening of the living being.

What is claimed is:

1. A radiation thermometer, comprising:
    a window member which can transmit an infrared ray from a measurement target;
    an infrared ray sensor for detecting said infrared ray;
    light-guiding means for guiding said infrared ray which is transmitted through said window member from the measurement target to said infrared ray sensor;
    a temperature-sensitive sensor arranged near said infrared ray sensor for measuring a temperature of said infrared ray sensor;
    case means which covers at least said light-guiding means, said infrared ray sensor and said temperature-sensitive sensor and which comprises a probe portion which is inserted into an opening of a living being;
    wherein said probe portion is provided with an opening portion only at an infrared ray introducing side of said light-guiding means and a holding member for holding said window member at said opening portion of the probe portion characterized in that a first water proofing means is arranged between said holding member and said probe portion, a second water proofing means is arranged between said holding member and said light-guiding means and said first and second water proofing means are both arranged at said opening portion of said probe portion.

2. The radiation thermometer of claim 1, wherein said holding member and said probe portion are arranged not to make contact with one another.

3. The radiation thermometer of claim 1, wherein the first and second water proofing means comprise a first packing and a second packing respectively.

4. The radiation thermometer of claim 3, wherein said holding member comprises a pressuring portion which presses and holds said window member towards said light-guiding means, and said window member is firmly held by said pressuring portion and said second packing.

5. The radiation thermometer of claim 3, wherein said light-guiding means is formed by a light-guiding tube, and said holding member comprises a monolithically integrated engagement portion which fits with an outer surface of said light-guiding tube.

6. The radiation thermometer of claim 5, wherein said light-guiding tube comprises a stepped portion for attaching said second packing to a front end portion of said light-guiding tube.

7. The radiation thermometer of claim 6, wherein said holding member comprises an abutting portion for abutting against said stepped portion for the purpose of positioning, said window member is firmly held between said holding member and said second packing with said abutting portion abutting said stepped portion, and a gap is provided between said window member and said front end portion of said light-guiding tube.

8. The radiation thermometer of claim 6, wherein said second packing protrudes beyond said front end portion of said light-guiding tube, and said window member is firmly held between said holding member and said second packing.

9. The radiation thermometer of claim 3, wherein said holding member comprises a concave portion for positioning said first or said second packing.

10. The radiation thermometer of claim 1, further comprising a temperature difference information detecting means for detecting temperature difference information regarding said infrared ray sensor and said light-guiding means, wherein said temperature calculating means calculates a temperature of said measurement target based on signals from said infrared ray sensor and said temperature-sensitive sensor and said temperature difference information received from said temperature difference information detecting means.

11. The radiation thermometer of claim 10, wherein
    said temperature-sensitive sensor comprises a first temperate-sensitive sensor for measuring a temperature of said infrared ray sensor and an area around the infrared sensor and the radiation thermometer further comprises a second temperature-sensitive sensor for measuring a temperature of said light-guiding means, and wherein said temperature difference information detecting means comprises said first and second temperature-sensitive sensors.

12. The radiation thermometer of claim 10, wherein said temperature difference information detecting means is formed by:
   a reference cavity whose temperature condition is approximately the same as a temperature condition of said light-guiding means and which is closed whereby infrared rays from outside do not enter; and
   a reference infrared ray sensor for detecting an infrared ray from said reference cavity.

13. The radiation thermometer of claim 1, wherein said window member is formed by an optical crystal material.

14. The radiation thermometer of claim 13, wherein said optical crystal material is selected from the group consisting of calcium fluoride, silicon, antireflection silicon, or barium fluoride.

15. The radiation thermometer of any one of claim 1, wherein a heat insulation cavity is disposed between said probe portion and said light-guiding means.

16. The radiation thermometer of claim 1, wherein said light-guiding means, said infrared ray sensor and said temperature-sensitive sensor are linked to each other by a metal housing.

17. A radiation thermometer, comprising:
   a window member which can transmit an infrared ray from a measurement target;
   an infrared ray sensor for detecting said infrared ray;
   light-guiding means for guiding said infrared ray which is transmitted through said window member from the measurement target to said infrared ray sensor;
   a temperature-sensitive sensor arranged near said infrared ray sensor for measuring a temperature of said infrared sensor;
   case means which covers at least said light-guiding means, said infrared ray sensor and said temperature-sensitive sensor and which comprises a probe portion which is inserted into an opening of a living being;
   the probe portion being provided with an opening portion only at an infrared ray introducing side of said light-guiding means;
   a holding member for holding said window member at said opening portion of the probe portion;
   a heat insulation cavity formed between said probe portion and said light guiding means;
   a first water proofing member provided between said holding member and said probe portion to prevent water from going into the inside of said probe portion including said heat insulation cavity through said opening portion of the said probe portion; and,
   a second water proofing member between said holding member and said light-guiding means.

* * * * *